United States Patent
Massey, Jr.

(10) Patent No.: US 9,139,370 B1
(45) Date of Patent: Sep. 22, 2015

(54) CONVEYOR SYSTEM AND A MECHANICAL CHAIN HAVING A PLURALITY OF LINKS

(71) Applicant: George W. Massey, Jr., Starr, SC (US)

(72) Inventor: George W. Massey, Jr., Starr, SC (US)

( * ) Notice: Subject to any disclaimer, the term of this patent is extended or adjusted under 35 U.S.C. 154(b) by 0 days.

(21) Appl. No.: 14/676,862

(22) Filed: Apr. 2, 2015

Related U.S. Application Data

(60) Provisional application No. 62/120,475, filed on Feb. 25, 2015.

(51) Int. Cl.
| | |
|---|---|
| *B65G 17/26* | (2006.01) |
| *B65G 17/38* | (2006.01) |
| *F16G 13/07* | (2006.01) |
| *B65G 17/40* | (2006.01) |
| *B65G 17/08* | (2006.01) |

(52) U.S. Cl.
CPC .............. *B65G 17/40* (2013.01); *B65G 17/086* (2013.01)

(58) Field of Classification Search
CPC ................................ B65G 17/26; F16G 13/07
USPC .............. 198/834, 835, 836.1, 850, 851, 852, 198/853
See application file for complete search history.

(56) References Cited

U.S. PATENT DOCUMENTS

| | | | |
|---|---|---|---|
| 2,911,091 A * | 11/1959 | Imse .............................. | 198/853 |
| 3,641,831 A | 2/1972 | Palmaer | |
| 3,881,593 A * | 5/1975 | Mushovic et al. ............. | 198/853 |
| 4,438,838 A * | 3/1984 | Hodlewsky et al. .......... | 198/853 |
| 4,473,365 A * | 9/1984 | Lapeyre ......................... | 474/212 |
| 4,611,710 A * | 9/1986 | Mitsufuji ................. | 198/867.15 |
| 4,729,469 A * | 3/1988 | Lapeyre et al. ................ | 198/834 |
| 4,993,544 A * | 2/1991 | Bailey et al. ................... | 198/834 |
| 5,335,768 A * | 8/1994 | Schladweiler ................ | 198/853 |
| 5,573,106 A * | 11/1996 | Stebnicki ........................ | 198/853 |
| 5,634,550 A * | 6/1997 | Ensch et al. .............. | 198/457.05 |
| 5,738,205 A * | 4/1998 | Dræbel .......................... | 198/852 |
| 6,305,530 B1 * | 10/2001 | Guldenfels .................... | 198/853 |
| 6,814,223 B1 * | 11/2004 | Verdigets et al. .......... | 198/844.1 |
| D511,298 S | 11/2005 | Layne et al. | |
| 7,080,729 B2 * | 7/2006 | Guldenfels et al. ........ | 198/844.1 |
| D532,025 S | 11/2006 | Wettlaufer | |
| D588,325 S | 3/2009 | Kamamoto et al. | |
| D638,603 S | 5/2011 | Jansen et al. | |
| 7,980,385 B2 * | 7/2011 | Guernsey ....................... | 198/850 |
| 8,016,100 B2 * | 9/2011 | Cornelissen et al. .......... | 198/834 |
| D655,882 S | 3/2012 | Franzaroli | |
| 8,783,449 B2 * | 7/2014 | Murakami ..................... | 198/850 |
| 9,051,125 B2 * | 6/2015 | Kurz ..................................... | 1/1 |

\* cited by examiner

*Primary Examiner* — Douglas Hess
(74) *Attorney, Agent, or Firm* — Dority & Manning, PA

(57) ABSTRACT

A link for a mechanical chain configured for engaging sprocket teeth is provided, the link having one or more features for minimizing pinch points and contamination within a conveyor system and for minimizing wear of the link when used within a conveyor system. A mechanical chain incorporating links with such features and a conveyor system incorporating the mechanical chain also are provided.

20 Claims, 13 Drawing Sheets

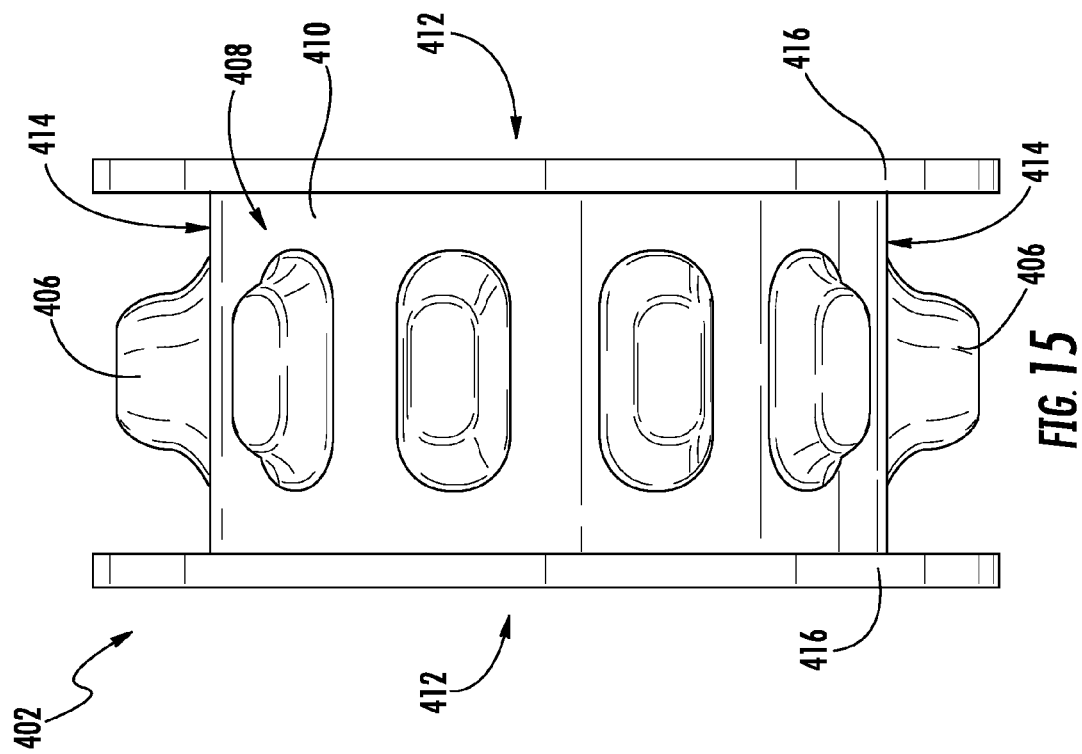

CONVEYOR SYSTEM AND A MECHANICAL CHAIN HAVING A PLURALITY OF LINKS

RELATED APPLICATIONS

The present application claims priority to U.S. Provisional Application Ser. No. 62/120,475, filed on Feb. 25, 2015, which is incorporated herein in its entirety by reference thereto.

FIELD OF THE INVENTION

The subject matter of the present disclosure relates generally to conveyor systems using mechanical chains, in particular mechanical chains having a plurality of links.

BACKGROUND OF THE INVENTION

Conveyor systems generally include one or more belts or chains for conveying items along a path defined by the conveyor system. Such chains may include a plurality of links that, in turn, engage a sprocket to drive the conveyor. When a conveyor chain is located within a workspace in close proximity to one or more users, typical chain configurations present hazards to the users, including areas where, e.g., a user's fingers, hands, or clothing could become caught or pinched in or between links of the chain. Further, holes, openings, or perforations in typical link and chain configurations can harbor contaminants such that the chains are undesirable for use in certain environments such as, e.g., food processing facilities, where the risk of contamination must be minimized.

In addition to safety and contamination hazards, typical chain and link configurations used in conveyor systems are prone to wear, which can negatively impact the performance of the chains and/or links. Wear of the chains and/or links necessitates system downtime for repair or replacement, which can be costly to the owner or user of the conveyor system.

Accordingly, a link for a mechanical chain configured to minimize pinch points within a conveyor system would be beneficial. A link for a mechanical chain configured to minimize contamination within a conveyor system also would be useful. Further, a link for a mechanical chain configured to minimize wear of the link within a conveyor system would be advantageous. Additionally, a mechanical chain for a conveyor system that minimizes pinch points, contamination, and wear would be beneficial. A conveyor system utilizing one or more mechanical chains that minimize pinch points, contamination, and wear also would be desirable. Further, because there are many installed conveyor systems, a link that embodies the above improvements yet is configured to operate in currently-installed conveyor systems would be desirable.

BRIEF DESCRIPTION OF THE INVENTION

The present invention provides a link for a mechanical chain configured for engaging sprocket teeth and having one or more features for minimizing pinch points and contamination within a conveyor system and for minimizing wear of the link when used within a conveyor system. A mechanical chain incorporating links with such features and a conveyor system incorporating the mechanical chain also are provided. Additional aspects and advantages of the invention will be set forth in part in the following description, may be apparent from the description, or may be learned through practice of the invention.

In a first exemplary embodiment, a link for a mechanical chain is provided. The link is configured for engaging sprocket teeth and defines a longitudinal direction, a transverse direction that is orthogonal to the longitudinal direction, and a vertical direction that is orthogonal to each of the longitudinal direction and the transverse direction. The link includes a body extending in the longitudinal direction between a leading end and a trailing end and defining a pair of opposing sides, each side extending along the longitudinal direction. The body includes a bottom surface extending transversely between the opposing sides and longitudinally between the leading end and the trailing end and defining a recess extending into the body in the vertical direction and configured for receipt of a sprocket tooth; a male hinge element defined by the leading end; a first female hinge element defined by the trailing end and disposed toward one opposite side of the body; and a second female hinge element defined by the trailing end and disposed toward the other opposite side of the body. The second female hinge element is spaced apart from the first female hinge element in the transverse direction so as to define a space between the two female hinge elements, the space being configured to complement the shape of the male hinge element. The longitudinal distance between the male hinge element and the first and second female hinge elements defines a link length $l_{link}$.

The body further includes a plate portion having a solid upper surface that extends uninterruptedly in the transverse direction from one opposing side of the body to the other opposing side of the body and that extends uninterruptedly in the longitudinal direction from a leading edge to a trailing edge. The upper surface of the plate portion forms the top surface of the body and has a height $h_{plate}$ measured in the vertical direction such that the height $h_{plate}$ is less than the link height $h_{link}$, which is the distance measured in the vertical direction between the top surface and bottom surface of the body other than the portion of the body surface defining the recess. The plate portion defines a male portion disposed closer to the leading end than to the trailing end and a female portion disposed closer to the trailing end than to the leading end, the female portion being configured to complement the male portion.

Also, each side of the body defines a respective siderail extending in the longitudinal direction of the body, each siderail being defined by: an upper surface disposed between the bottom surface of the body and the plate portion of the body, the upper surface including a pin-guiding surface; a height $h_{rail}$ extending in the vertical direction from the bottom surface of the body to the upper surface of the siderail; a length $l_{rail}$ extending in the longitudinal direction from the respective female hinge element toward the male hinge element; and a width $w_{rail}$ extending in the transverse direction.

In a second exemplary embodiment, a mechanical chain is provided. The mechanical chain includes a plurality of pins and a plurality of links configured for engaging sprocket teeth. The links define a longitudinal direction, a transverse direction that is orthogonal to the longitudinal direction, and a vertical direction that is orthogonal to each of the longitudinal direction and the transverse direction. Each link comprises a body extending in the longitudinal direction between a leading end and a trailing end, the body defining a pair of opposing sides, each side extending along the longitudinal direction. The body includes a bottom surface extending transversely between the opposing sides and longitudinally between the leading end and the trailing end and defining a recess extending into the body in the vertical direction and configured for receipt of a sprocket tooth; a male hinge element defined by the leading end and including an aperture that extends therethrough in the transverse direction, the aperture having opposing ends; a first female hinge element defined by the trailing end and disposed toward one opposite side of the body, the first female hinge element including an aperture that extends therethrough in the transverse direction; and a second female hinge element defined by the trailing end and disposed toward the other opposite side of the body, the second female hinge element including an aperture that extends therethrough in the transverse direction. The second female hinge element is spaced apart from the first female hinge element in the transverse direction so as to define a space between the two female hinge elements, the space being configured to complement the shape of the male hinge element. The longitudinal distance between the male hinge element and the first and second female hinge elements defines a link length $l_{link}$.

The body further includes a plate portion having a solid upper surface that extends uninterruptedly in the transverse direction from one opposing side of the body to the other opposing side of the body and that extends uninterruptedly in the longitudinal direction from a leading edge to a trailing edge. The upper surface of the plate portion forms the top surface of the body and has a height $h_{plate}$ measured in the vertical direction such that the height $h_{plate}$ is less than the link height $h_{link}$, which is the distance measured in the vertical direction between the top surface and bottom surface of the body other than the portion of the body surface defining the recess. The plate portion defines a male portion disposed closer to the leading end than to the trailing end and a female portion disposed closer to the trailing end than to the leading end, the female portion being configured to complement the male portion.

Also, each side of the body defines a respective siderail extending in the longitudinal direction of the body, each siderail being defined by: an upper surface disposed between the bottom surface of the body and the plate portion of the body, the upper surface including a pin-guiding surface; a height $h_{rail}$ extending in the vertical direction from the bottom surface of the body to the upper surface of the siderail; a length $l_{rail}$ extending in the longitudinal direction from the respective female hinge element toward the male hinge element; and a width $w_{rail}$ extending in the transverse direction. The male hinge element of one link is positioned within the space defined by the first female hinge element and second female hinge element of an adjacent, identically-configured link, and the aperture of the male hinge element of the one link and the apertures of the first and second hinge elements of the adjacent, identically-configured link are coincident and one of the plurality of pins is received in the apertures of the coincident apertures.

In a third exemplary embodiment, a conveyor system is provided. The conveyor system includes at least one chain having a plurality of pins and a plurality of links configured for engaging sprocket teeth and defining a longitudinal direction, a transverse direction that is orthogonal to the longitudinal direction, and a vertical direction that is orthogonal to each of the longitudinal direction and the transverse direction. Each link comprises a body extending in the longitudinal direction between a leading end and a trailing end, the body defining a pair of opposing sides, each side extending along the longitudinal direction. The body includes a bottom surface extending transversely between the opposing sides and longitudinally between the leading end and the trailing end and defining a recess extending into the body in the vertical direction and configured for receipt of a sprocket tooth; a male hinge element defined by the leading end and including an aperture that extends therethrough in the transverse direction, the aperture having opposing ends; a first female hinge element defined by the trailing end and disposed toward one opposite side of the body, the first female hinge element including an aperture that extends therethrough in the transverse direction; and a second female hinge element defined by the trailing end and disposed toward the other opposite side of the body, the second female hinge element including an aperture that extends therethrough in the transverse direction. The second female hinge element is spaced apart from the first female hinge element in the transverse direction so as to define a space between the two female hinge elements, the space being configured to complement the shape of the male hinge element. The longitudinal distance between the male hinge element and the first and second female hinge elements defines a link length $l_{link}$.

The body further includes a plate portion having a solid upper surface that extends uninterruptedly in the transverse direction from one opposing side of the body to the other opposing side of the body and that extends uninterruptedly in the longitudinal direction from a leading edge to a trailing edge. The upper surface of the plate portion forms the top surface of the body and has a height $h_{plate}$ measured in the vertical direction such that the height $h_{plate}$ is less than the link height $h_{link}$, which is the distance measured in the vertical direction between the top surface and bottom surface of the body other than the portion of the body surface defining the recess. The plate portion defines a male portion disposed closer to the leading end than to the trailing end and a female portion disposed closer to the trailing end than to the leading end, the female portion being configured to complement the male portion.

Also, each side of the body defines a respective siderail extending in the longitudinal direction of the body, each siderail being defined by: an upper surface disposed between the bottom surface of the body and the plate portion of the body, the upper surface including a pin-guiding surface; a height $h_{rail}$ extending in the vertical direction from the bottom surface of the body to the upper surface of the siderail; a length $l_{rail}$ extending in the longitudinal direction from the respective female hinge element toward the male hinge element; and a width $w_{rail}$ extending in the transverse direction. The male hinge element of one link is positioned within the space defined by the first female hinge element and second female hinge element of an adjacent, identically-configured link, and the aperture of the male hinge element of the one link and the apertures of the first and second hinge elements of the adjacent, identically-configured link are coincident and one of the plurality of pins is received in the apertures of the coincident apertures.

The conveyor system further includes a support structure having a plurality of vertical supports, a plurality of horizontal supports, and at least one guide wall; an upper track for receipt of a portion of the chain; a lower track for receipt of another portion of the chain; and a sprocket assembly including a sprocket shaft and a sprocket having plurality of sprocket teeth configured to engage the links of the chain.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 15 provides an end view of a sprocket according to an exemplary embodiment of the present subject matter.

DETAILED DESCRIPTION OF THE INVENTION

Figure 1:
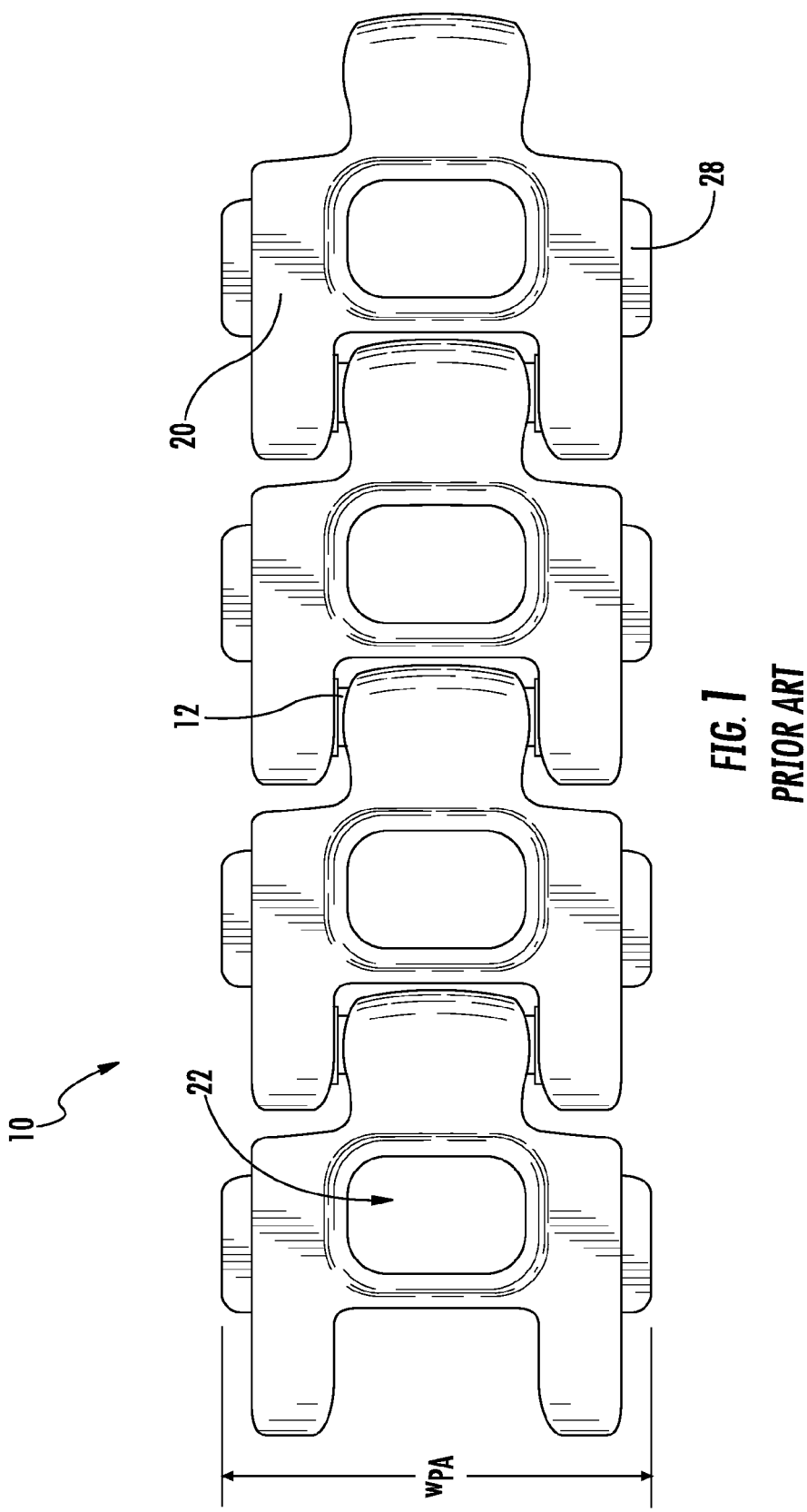
FIG. 1 provides a top view of a four link section of a prior art mechanical chain.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
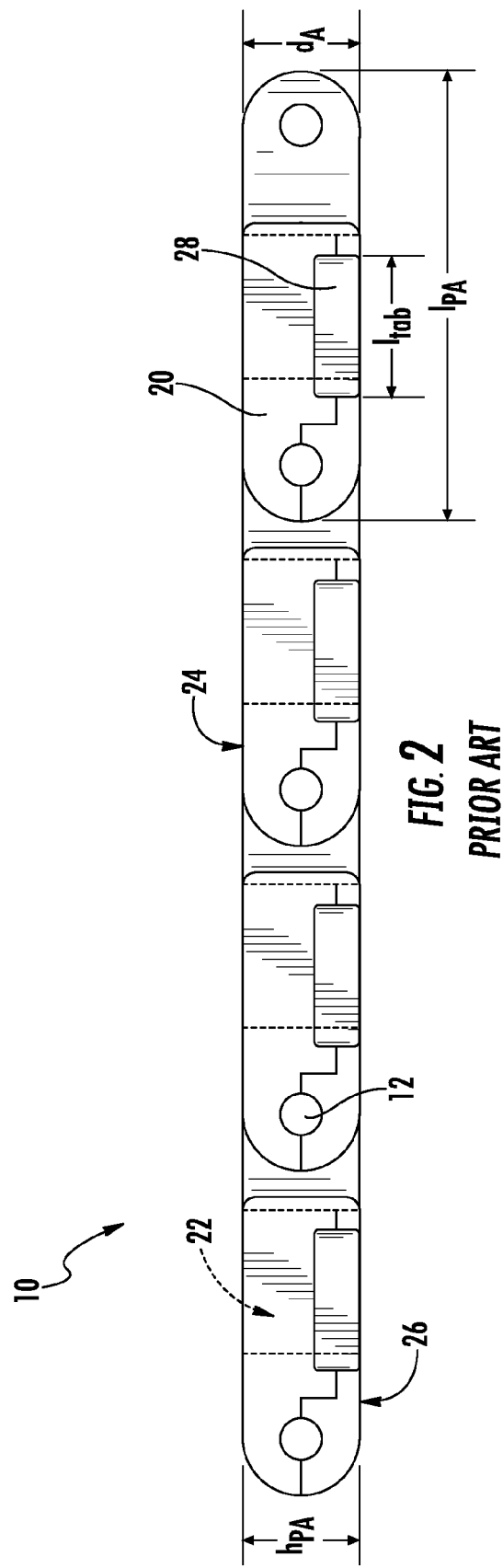
FIG. 2 provides a side view of the prior art mechanical chain of FIG. 1.

FIG. 1 provides a top view of a mechanical chain 10 according to the prior art. FIG. 2 provides a side view of the mechanical chain of FIG. 1. Chain 10 comprises a plurality of links 20; one link 20 is joined to an adjacent link 20 using a pin 12. Each link 20 has a height $h_{P4}$, a length $l_{P4}$, and a width $w_{P4}$. Additionally, each link 20 defines an opening 22 extending from a top surface 24 to a bottom surface 26 of link 20 such that each opening 22 extends the entire height $h_{P4}$ of link 20. Further, tabs 28 having a length $l_{tab}$ project from each side of link 20.

Figure 3:
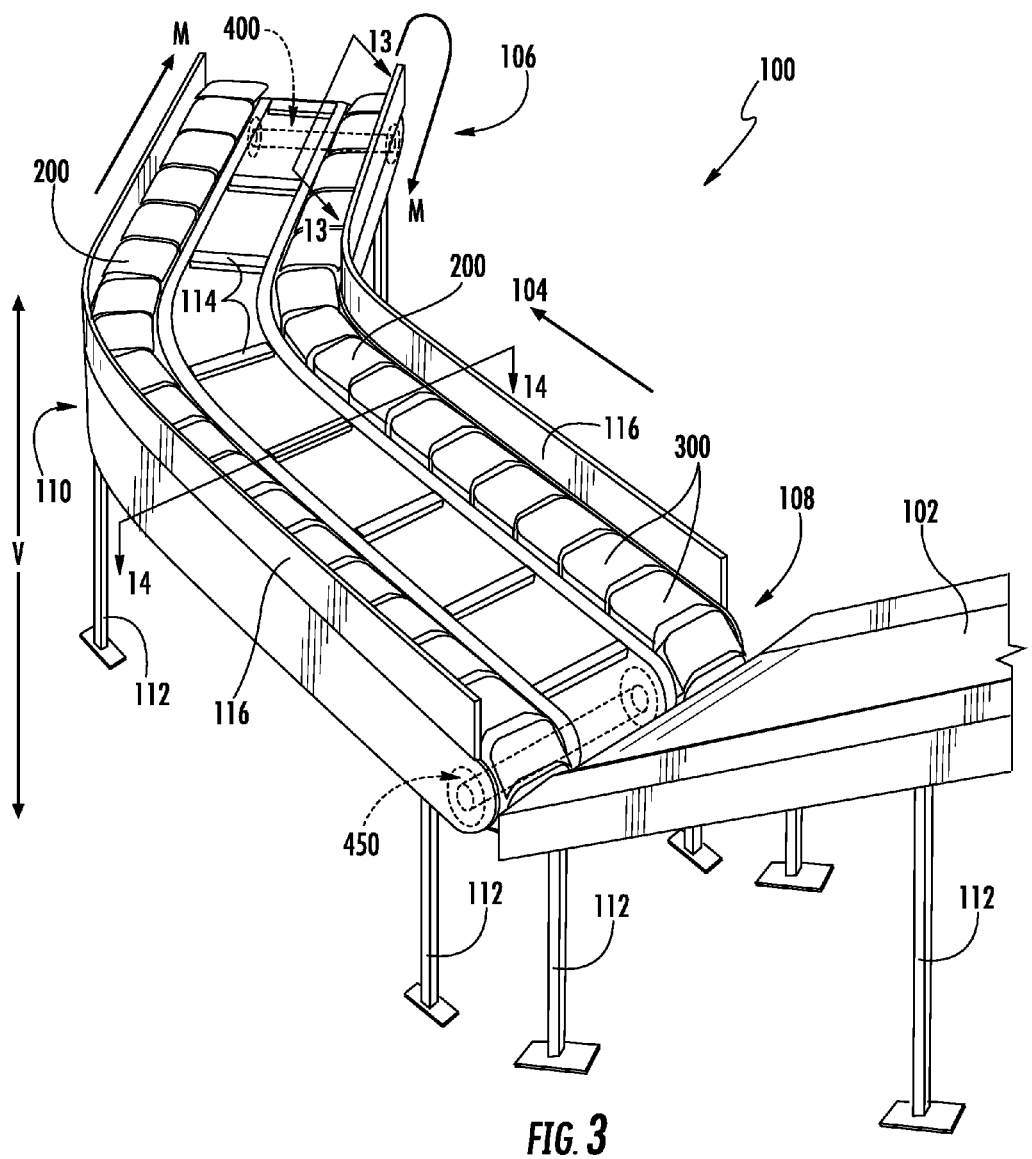
FIG. 3 provides a perspective view of a conveyor system according to an exemplary embodiment of the present subject matter.

FIG. 3 provides a perspective view of a portion of a conveyor system 100 according to the present subject matter. In the illustrated embodiment, two mechanical chains 200 are used to form a conveyor to convey thereon items such as, e.g., empty or loaded boxes or the like. Each chain is formed from a plurality of links 300 having a top surface (FIG. 5) on which the items to be conveyed are placed. As shown in FIG. 3, the two chains 200 are positioned equidistant from each other throughout conveyor system 100, i.e., in the exemplary embodiment, one chain 200 is parallel to the other chain 200 at any point within conveyor system 100. As will be readily understood, one, two, or more than two chains may be used to form a conveyor to convey items thereon. Additionally, when more than one chain 200 is used within conveyor system 100, the chains may or may not be parallel at every point within conveyor system 100. Chain 200 is described in greater detail below.

Within conveyor system 100, chains 200 are supported on a support structure 110 including a plurality of vertical supports 112 and a plurality of horizontal supports 114. As shown in FIG. 3, support structure 110 also may include one or more guide walls 116, e.g., to help guide items as they are conveyed by conveyor system 100. Additionally, other components such as, e.g., ramp or slide 102 may be used in conveyor system 100 to transfer items from one portion of system 100 to another portion.

As further illustrated in FIG. 3, chains 200 of conveyor system 100 are driven by a sprocket assembly 400 positioned at a drive end 106 of conveyor system 100, with an idler assembly 450 positioned at a return end 108 of system 100 to guide chains 200. Specifically, each chain 200 generally traverses a loop such that links 300 of chains 200 in the upper grouping of the loop are pulled by sprocket assembly 400 away from idler assembly 450 along a direction of movement M, with a portion of each chain 200 exposed for the placement of items thereon. Links 300 in the lower grouping of the loop are pushed toward idler assembly 450 in a direction opposite to the direction of movement M. Conveyor system 100 and sprocket assembly 400 are described in greater detail below.

Figure 4:
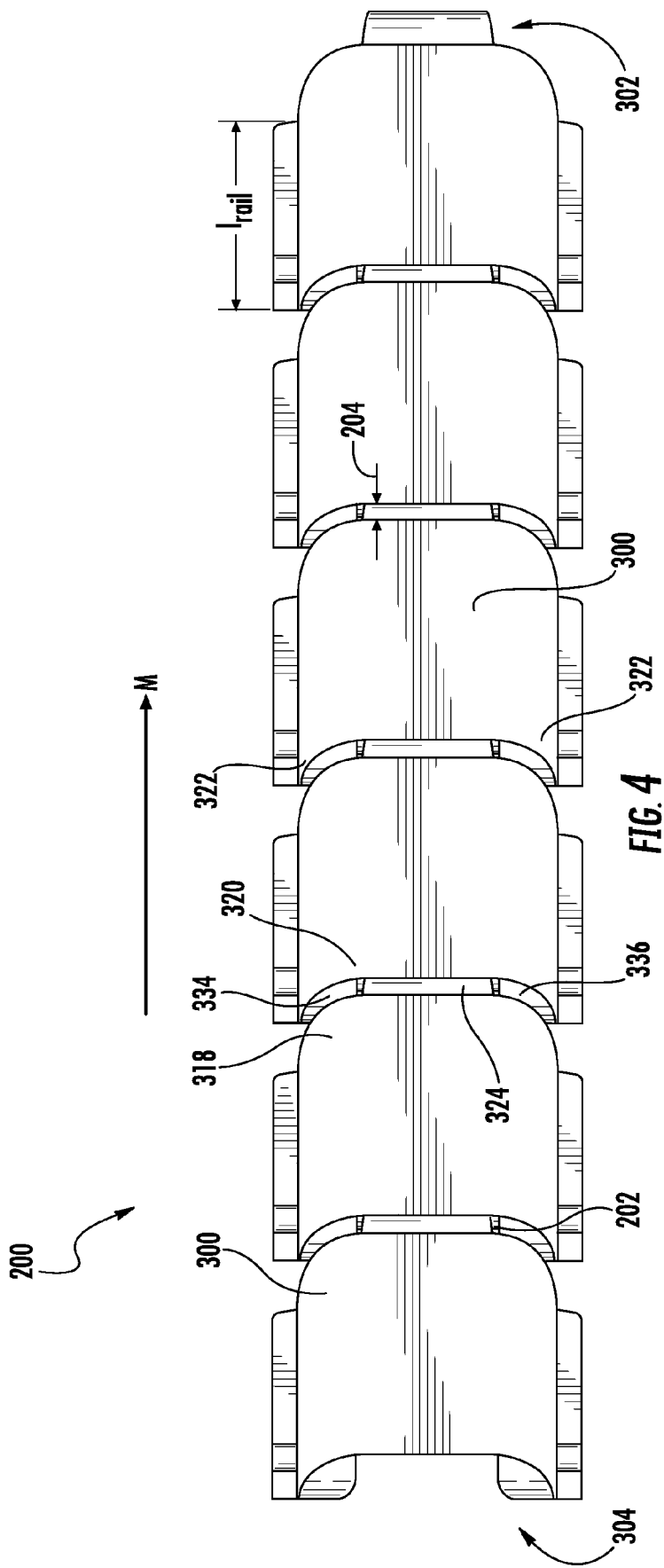
FIG. 4 provides a top view of a six link section of a mechanical chain according to an exemplary embodiment of the present subject matter.

FIG. 4 provides a top view of a portion of an exemplary mechanical chain 200 of the present subject matter. As shown, a plurality of links 300 are joined with a plurality of pins 202 to form chain 200. Each link 300 includes a leading end 302 and a trailing end 304 oriented along the direction of movement M, with leading end 302 of each link 300 traversing the path of chain 200 before trailing end 304. Additionally, each link 300 is shaped to complement each adjacent link 300, as further described below.

Figure 5:
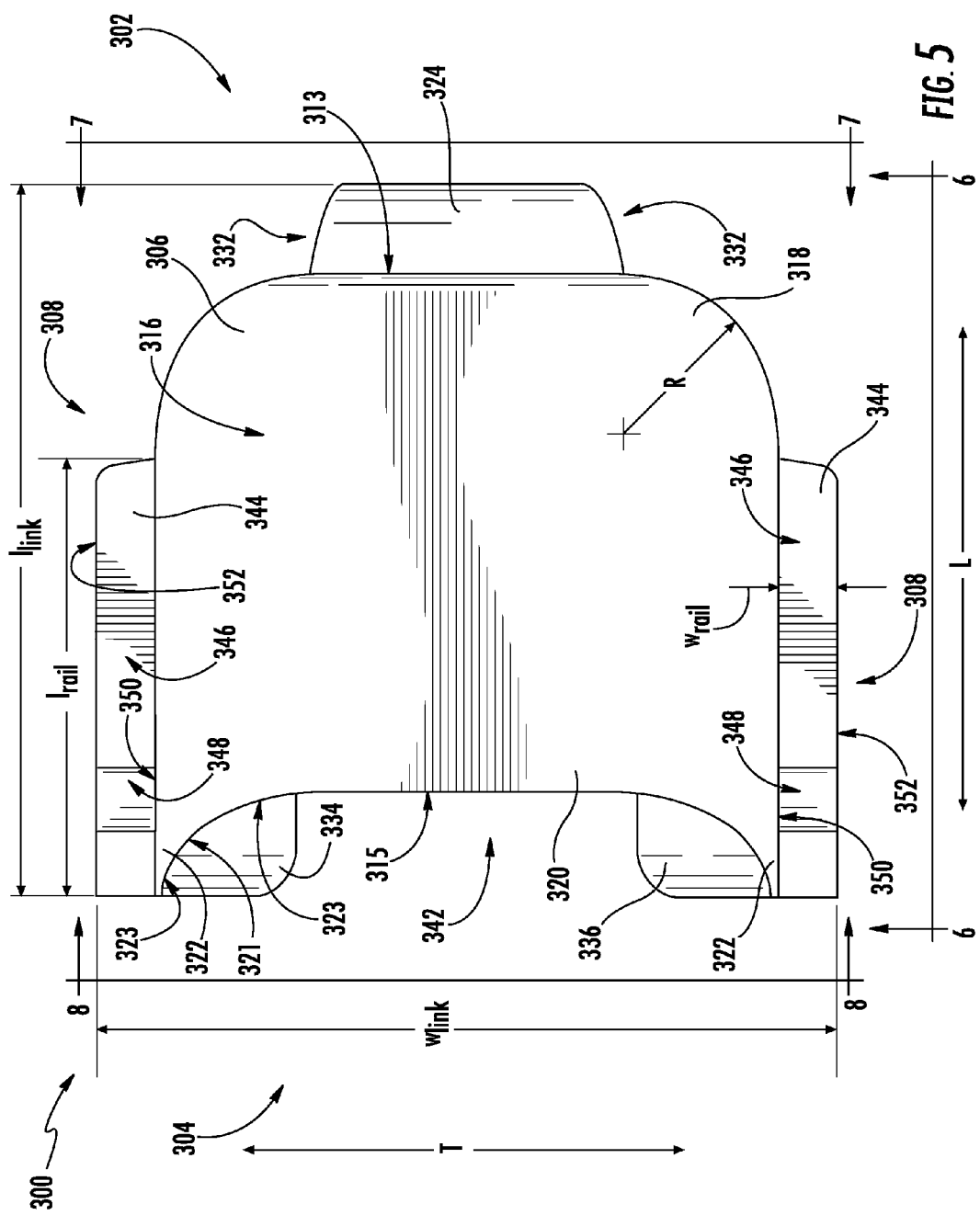
FIG. 5 provides a top view of a link of a mechanical chain according to an exemplary embodiment of the present subject matter, the opposite side view being a mirror image.

FIGS. 5 through 12 illustrate an exemplary link 300 of chain 200 of the present subject matter. Referring to FIG. 5, link 300 has a body 306 extending in a longitudinal direction L between leading end 302 and a trailing end 304. Body 306 defines a pair of opposing sides 308. Each side 308 elongates or extends along the longitudinal direction L, and body 306 extends along a transverse direction T therebetween. The transverse direction T is orthogonal to the longitudinal direction L.

Figure 9:
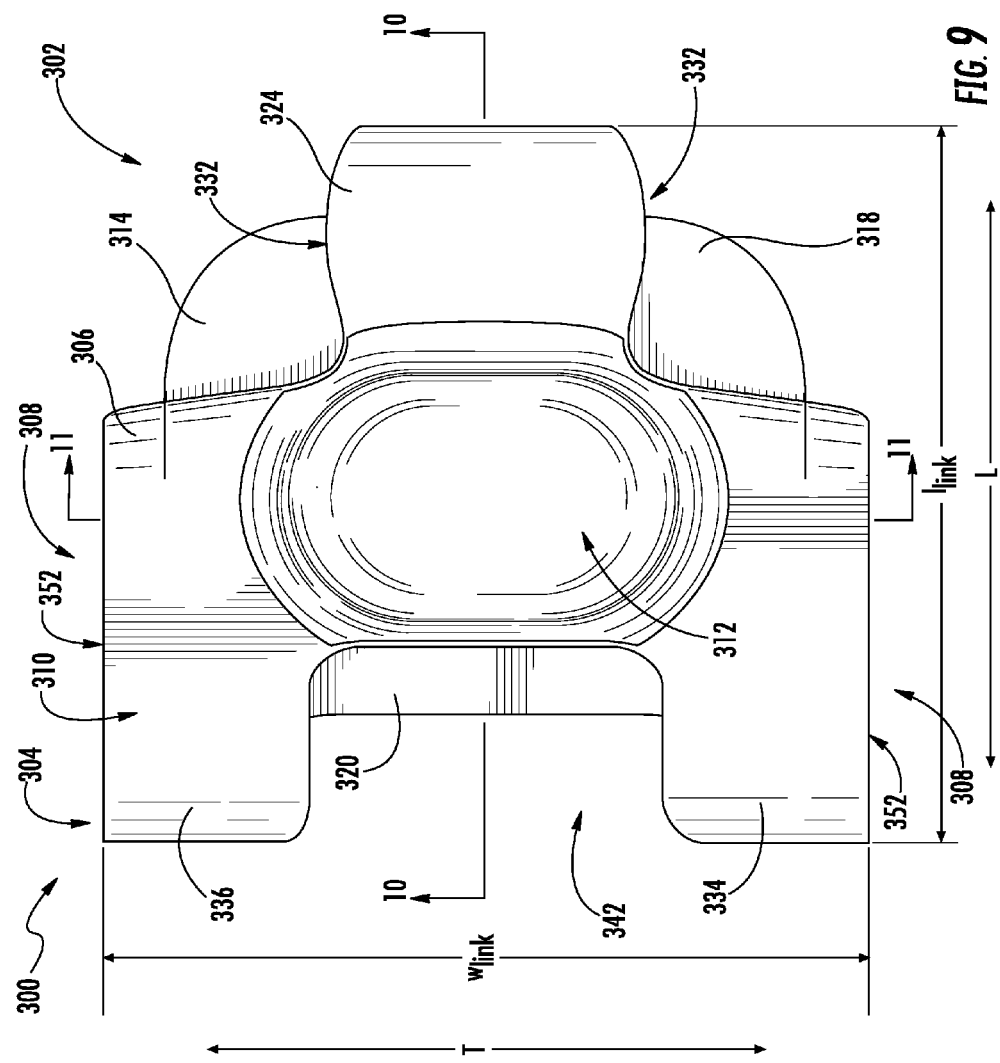
FIG. 9 provides a bottom view of the link of FIG. 5.
Figures 10, 11, 12:
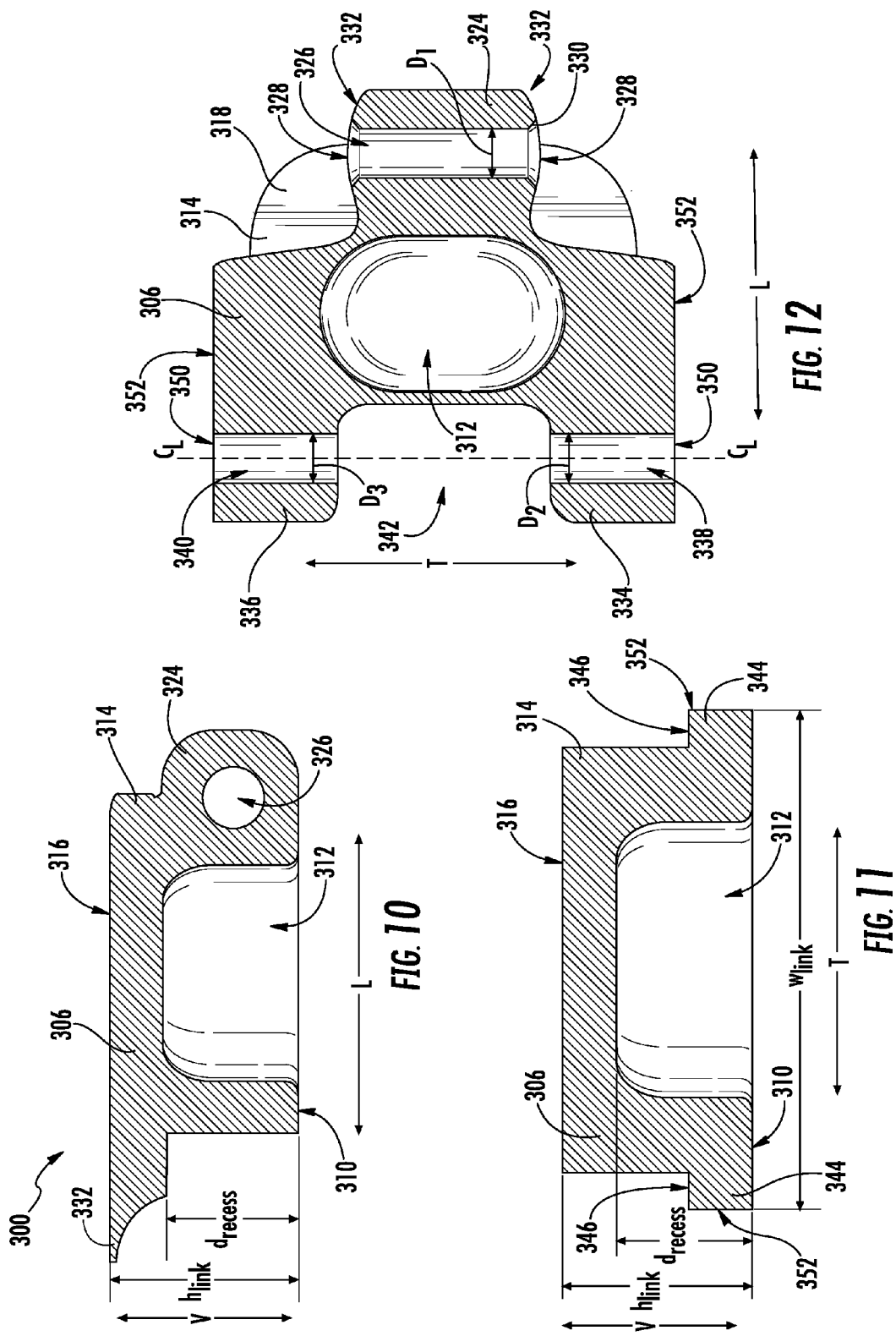
FIG. 10 provides a cross-section view of the link of FIG. 5, taken along the line of sight of arrows 10-10 shown in FIG. 9.
FIG. 11 provides a cross-section view of the link of FIG. 5, taken along the line of sight of arrows 11-11 shown in FIG. 5.
FIG. 12 provides a cross-section view of the link of FIG. 5, taken along the line of sight of arrows 12-12 shown in FIG. 6.

Referring now to FIG. 9, body 306 includes a bottom surface 310 extending transversely between the opposing sides 308 and longitudinally between leading end 302 and trailing end 304. Bottom surface 310 defines a recess 312 extending into body 306 in a vertical direction V (FIGS. 6, 8, 10, 11) to a depth $d_{recess}$ (FIGS. 10, 11). Recess 312 is configured in size and shape for receipt of a sprocket tooth 406 (FIG. 13) of complementary size and shape, e.g., as hand-in-glove. The vertical direction V is orthogonal to each of the longitudinal direction L and the transverse direction T.

Figure 6:
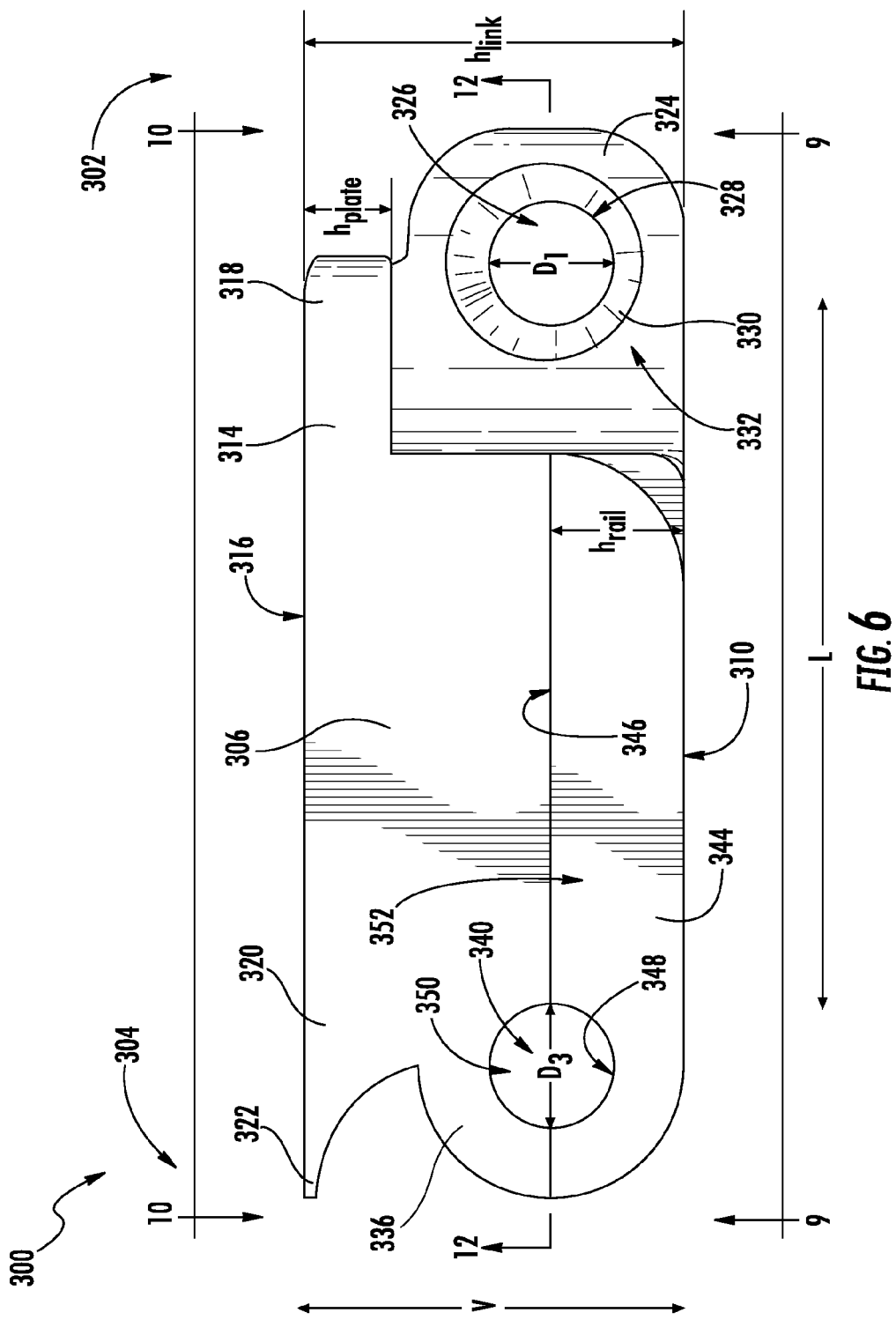
FIG. 6 provides a side view of the link of FIG. 5.

As shown in, e.g., FIG. 6, body 306 further includes a plate portion 314 having a solid upper surface 316. Upper surface 316 of plate portion 314 forms the top surface of body 306 (FIG. 5), and as such, alternately may be referred to as upper surface or top surface 316. Upper or top surface 316 extends uninterruptedly in the transverse direction T from one opposing side 308 of body 306 to the other opposing side 308 of body 306. Upper or top surface 316 also extends uninterruptedly in the longitudinal direction L from a leading edge 313 to a trailing edge 315.

Link 300 has a height $h_{link}$ that is measured in the vertical direction V between top surface 316 and bottom surface 310, other than the portion of bottom surface 310 defining recess 312. Additionally, plate portion 314 has a height $h_{plate}$ that is measured in the vertical direction V such that height $h_{plate}$ is less than the link height $h_{link}$, is i.e., height $h_{plate}$ is a portion of the overall height $h_{link}$ of link 300.

Moreover, as illustrated in, e.g., FIGS. 10 and 11, the depth $d_{recess}$ of recess 312 is less than link height $h_{link}$. That is, unlike opening 22 of the prior art links 20 shown in FIGS. 1 and 2 having a depth $d_{PA}$ extending from top surface 24 to bottom surface 26, recess 312 does not extend through body 306 from bottom surface 310 to top surface 316. Accordingly, top surface 316 is a solid, uninterrupted surface, reducing possible areas for contaminants, e.g., from items placed on link 300, to accumulate and preventing a user's finger, hand, or clothing or other items from being caught in a link.

Referring back to FIG. 5, plate portion 314 defines a male portion 318, which is disposed closer to leading end 302 than to trailing end 304. Male portion 318 has a generally rounded segment disposed toward each side 308. A top edge of each rounded segment has a radius of curvature R extending between a section that becomes tangent to the leading edge 313 of plate portion 314 and a section that becomes tangent to the respective nearby side 308.

Plate portion 314 further defines a female portion 320, which is disposed closer to trailing end 304 than to leading end 302 and is configured in size and shape to complement male portion 318. Female portion 320 defines a horn segment 322 disposed toward each opposite side 308 of body 306 such that there are two horn segments 322. Horn segments 322 generally define the shape of female portion 320 as a complement to the shape of male portion 318 (FIG. 4). In the exemplary embodiment shown in FIG. 5, male portion 318 and female portion 320 are shaped or formed such that top surface 316 is generally D-shaped. As shown in the top view of FIG. 5, a top edge 321 of each horn segment 322 defines the same radius of curvature, which is substantially equal to the radius of curvature R of each rounded segment of male portion 318. One end 323 of the top edge 321 of each horn segment 322 becomes tangent to the trailing edge 315 of plate portion 314. The opposite end 323 of the top edge 321 of each horn segment 322 becomes tangent to the respective nearby side 308. Top surface 316 may have other shapes and configurations as well.

Leading end 302 defines a male hinge element 324 that vertically is disposed between plate portion 314 and bottom surface 310 of body 306, as shown in, e.g., FIGS. 6, 7, 9, and 10. That is, in the illustrated exemplary embodiment, plate portion 314 may extend a vertical distance equal to height $h_{plate}$ above male hinge element 324. Further, male hinge element 324 transversely is disposed between opposing sides 308, as shown in, e.g., FIGS. 5, 7, 9, and 12. Male hinge element 324 includes an aperture 326 (FIG. 6) that extends through male hinge element in the transverse direction T (FIG. 12), which is orthogonal to the longitudinal direction L.

As illustrated in FIGS. 6 and 12, aperture 326 has opposing ends 328 and a diameter $D_1$. Each end 328 of aperture 326 has a tapered portion 330, which is generally frustoconical in shape and gradually diminishes in diameter from end 328 inward along the transverse direction T. That is, the largest diameter of tapered portion 330 is larger than diameter $D_1$ of aperture 326 and is positioned adjacent one side 332 of male hinge element 324. Tapered portion 330 gradually decreases in diameter from side 332 of male hinge element 324 until the diameter is equal to diameter $D_1$. In an exemplary embodiment, the largest diameter of tapered portion 330, i.e., the diameter adjacent sides 332, may be about 0.400 inches, and diameter $D_1$ may be about 0.260 inches; however, in other embodiments, tapered portion 330 and diameter $D_1$ may have other values.

Referring to FIGS. 5, 6, 8, 9, and 12, trailing end 304 defines a first female hinge element 334 disposed toward one side 308 of body 306 and a second female hinge element 336 disposed toward the opposite side 308 of body 306. First female hinge element 334 and second female hinge element 336 vertically are disposed between plate portion 314 and bottom surface 310 of body 306. That is, in the illustrated exemplary embodiment, plate portion 314 may extend a vertical distance equal to height $h_{plate}$ above first and second female hinge elements 334, 336. Additionally, as shown in FIG. 5, for example, the longitudinal distance between the leading edge of male hinge element 324 and the trailing edges of first and second female hinge elements 334, 336 defines a length $l_{link}$ of link 300.

As shown in FIG. 12, first female hinge element 334 defines an aperture 338 extending through hinge element 334 along the transverse direction T. Similarly, second female hinge element 336 defines an aperture 340 extending through hinge element 336 along the transverse direction T. Apertures 338, 340 may be generally aligned such that a common straight, axial centerline $C_L$ extends through apertures 338, 340. Further, aperture 338 may have a diameter $D_2$, and aperture 340 may have a diameter $D_3$. In some embodiments, such as the embodiment illustrated in FIGS. 6 and 12, diameters $D_2$, $D_3$ may be substantially equal, i.e., apertures 338, 340 may approximately have the same diameter. In other embodiments, one of diameters $D_2$, $D_3$ may be larger than the other diameter, i.e., diameter $D_2$ may be larger than diameter $D_3$ or diameter $D_3$ may be larger than diameter $D_2$. In an exemplary embodiment, diameters $D_2$, $D_3$ may be substantially equal and measure approximately 0.252 inches; however, as described, diameters $D_2$, $D_3$ may have other values as well.

As illustrated in, e.g., FIGS. 5 and 9, second female hinge element 336 is spaced apart from first female hinge element 334 in the transverse direction T to define a space 342 between female hinge elements 334, 336. Space 342 is configured to complement the shape of male hinge element 324 such that when a male hinge element 324 of an identically configured link 300 is received in space 342, aperture 326 of male hinge element 324 of the identically configured link is coincident with both apertures 338, 340 of female hinge elements 334, 336 that define space 342. Thus, the common axial centerline $C_L$ of apertures 338, 340 may extend through aperture 326. Further, in some embodiments of link 300, diameter $D_1$ of aperture 326 may be substantially equal to diameters $D_2$, $D_3$ of apertures 338, 340. In alternative embodiments, diameter $D_1$ may be larger or smaller than one or both of diameters $D_2$, $D_3$.

Additionally, each side 308 of body 306 defines a respective siderail 344 that elongates or extends along the longitudinal direction L. Referring to FIGS. 5 and 6, each siderail 344 includes an upper surface 346 disposed between bottom surface 310 and plate portion 314 of body 306. Upper surface 346 of siderail 344 includes a pin-guiding surface 348 defined next to an outer end 350 of apertures 338, 340, i.e., outer end 350 of the respective nearer female hinge element 334, 336. Each respective pin-guiding surface 348 is shaped coincidentally with the respective aperture 338, 340 of the respective nearer female hinge element 334, 336. That is, pin-guiding surface 348 defined next to outer end 350 of aperture 338 of first female hinge element 334 is shaped coincidentally with aperture 338, and pin-guiding surface 348 defined next to outer end 350 of aperture 340 of second female hinge element 336 is shaped coincidentally with aperture 340.

Figure 7:
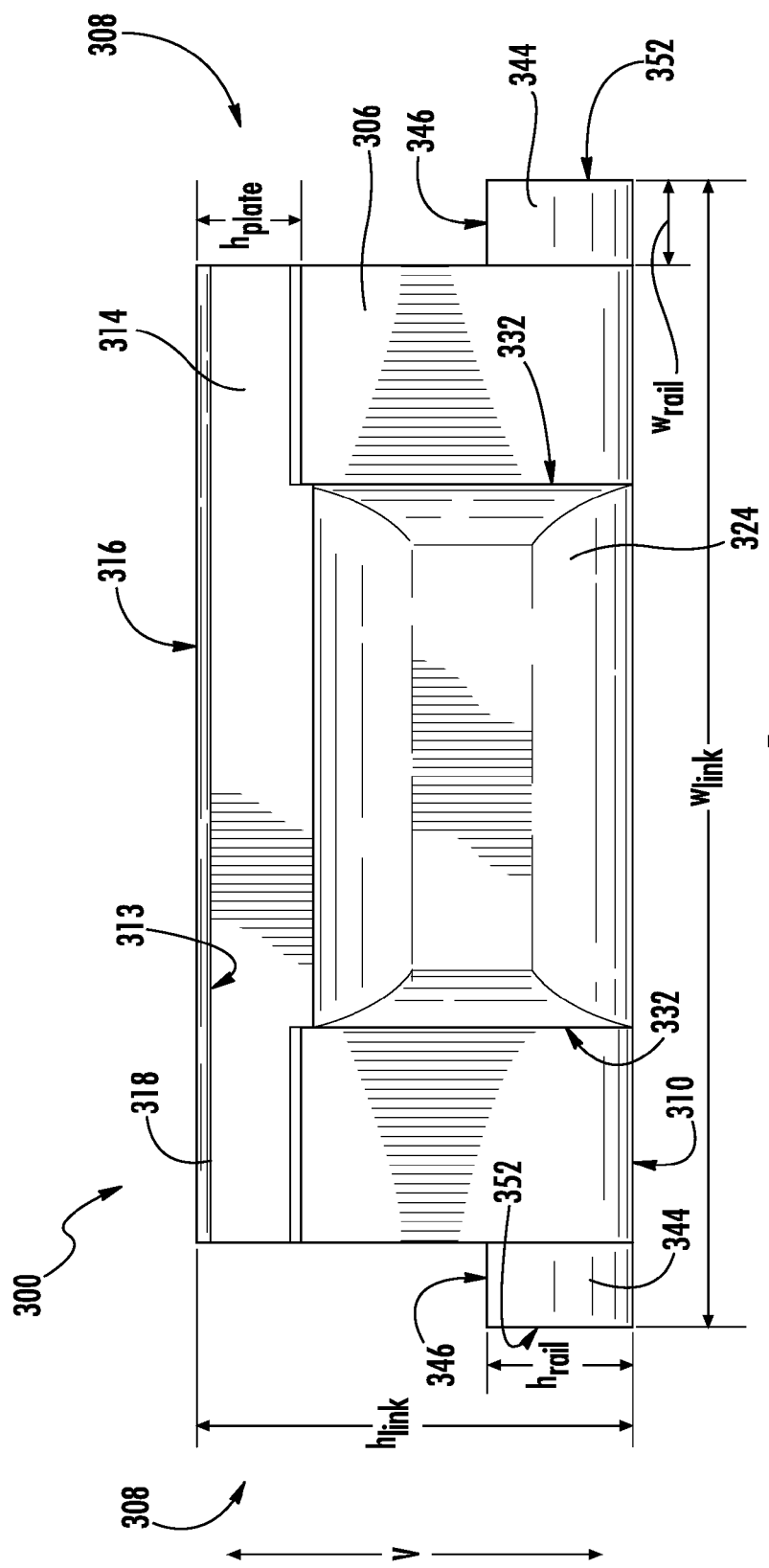
FIG. 7 provides a leading end view of the link of FIG. 5.
Figure 8:
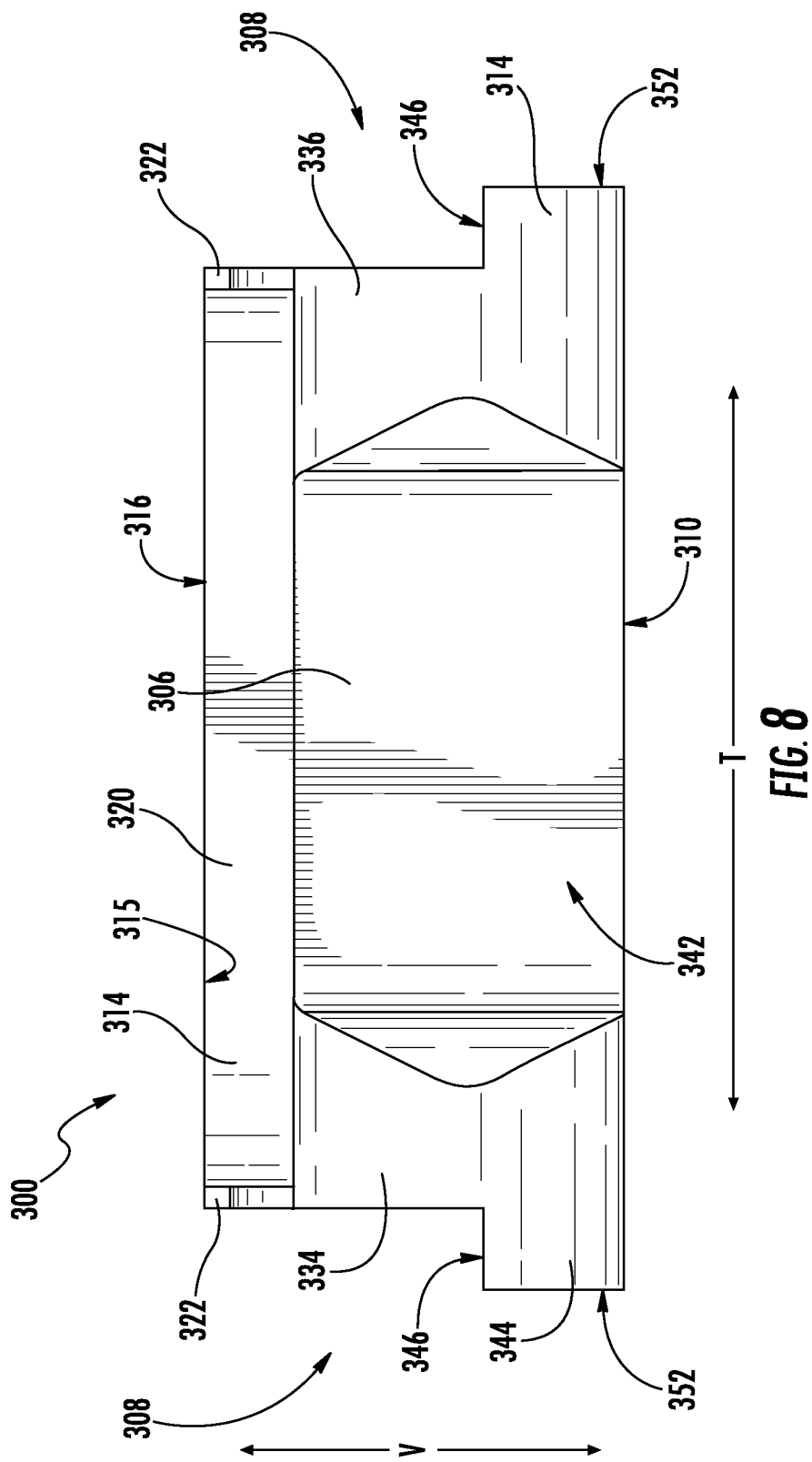
FIG. 8 provides a trailing end view of the link of FIG. 5.

As shown in FIG. 6, for example, each siderail 344 has a height $h_{rail}$ extending in the vertical direction V from bottom surface 310 of body 306 to upper surface 346 of siderail 344. As further illustrated in FIG. 5, for example, each siderail 344 has a length $l_{rail}$ elongating or extending in the longitudinal direction L from the trailing edge of the respective female hinge element 334, 336 toward male hinge element 324. Moreover, as shown in FIG. 7, for example, each siderail 344 has a width $w_{rail}$ extending in the transverse direction T. The width $w_{rail}$ of each siderail 344 is sufficient to ensure that the side-to-side distance measurement of top surface 316 of plate portion 314 is less than the side-to-side distance measurement of bottom surface 310 of body 306. In addition, as illustrated in, e.g., FIG. 7, each siderail 344 includes an outer surface 352, and the outer surface 352 of one siderail 344 is spaced apart along the transverse direction T from outer surface 352 of the other siderail 344 to define a width $w_{link}$ of link 300. In some embodiments, as shown in, e.g., FIG. 6, bottom surface 310 may be curved or rounded at each end of each siderail 344; that is, bottom surface 310 at each end of siderail 344 may be curved or rounded along the transverse direction T over width $w_{rail}$. Other portions of bottom surface 310 also may be curved or rounded, which may help link 300, e.g., smoothly traverse path 104 (FIG. 3) of conveyor system 100 as curved or rounded surfaces of link 300 may be less likely to catch on, e.g., an edge of a surface as link 300 slides on or over the surface.

Referring back to FIG. 4, to form chain 200, the male hinge element 324 of one link 300 fits into space 342 defined between first and second female hinge elements 334, 336 of an adjacent, identically-configured link 300 such that apertures 326, 338, and 340 are aligned for receipt of a pin 202. Pin 202 desirably is formed of stainless steel or the like and joins or holds together the adjacent links 300. When apertures 326, 338, and 340 are aligned for receipt of pin 202, i.e., when aperture 338 is disposed adjacent one end 328 of aperture 326 and aperture 340 is disposed adjacent the other end 328 of aperture 326, pin 202 may be, e.g., press-fit into apertures 338 and 340 such that pin 202 is fixed in place from aperture 338 through aperture 326 and into aperture 340. In some embodiments, at least one end of pin 202 may be knurled such that pin 202 resists slipping or moving from apertures 326, 338. In other embodiments, apertures 338 and 340 may include one or more ribs such that the diameter of each aperture 338, 340 is not continuous along the aperture, i.e., a portion of diameter $D_2$ of aperture 338 is smaller than the diameter of the remainder of aperture 338 and a portion of diameter $D_3$ of aperture 340 is smaller than the diameter of the remainder of aperture 340. Other configurations of apertures 326, 338, 340 and/or male hinge element 324, first female hinge element 334, and second female hinge element 336 also may be used to secure pin 202 to join links 300.

As illustrated in FIG. 4, in one exemplary embodiment of chain 200, male portion 318 of plate portion 314 of one link 300 vertically overlies first and second female hinge elements 334, 336 of an adjacent link 300 such that the male portion 318 aligns with the complementary-shaped female portion 320 of plate portion 314 of the adjacent link 300. In some embodiments, such as the exemplary embodiment illustrated in FIG. 4, male portion 318 of one link 300 does not contact female portion 320 of an adjacent, identically-configured link 300, i.e., a space 204 may be defined between male portion 318 of the one link and female portion 320 of the adjacent link. However, the fit between pin 202 and aperture 326 of male hinge element 324 may be somewhat loose such that male hinge element has a limited range of motion within space 342 between first and second hinge elements 334, 336 of the adjacent link 300. Thus, space 204 may not have a defined length between male portion 318 and female portion 320 of adjacent links but may have a range of lengths based on the amount of movement or "play" male hinge element 324 has within space 342. Further, as one link 300 moves with respect to an adjacent link 300, horn segments 322 help prevent a user's finger, hand, or clothing from being caught or pinched between any two connected links.

In other embodiments, male portion 318 of one link 300 may abut female portion 320 of an adjacent link 300 such that no space 204 is provided between top surface 316 of the one link and top surface 316 of the adjacent link. Additionally, the fit or spacing between the plurality of links 300 forming chain 200 may be the same for every pair of adjacent links 300 or may vary between adjacent link pairs. As further illustrated, the length $l_{rail}$ of siderails 344 elongates or extends along a greater portion of the length of link 300 than the prior art link 20 and, thus, is greater than the length $l_{tab}$ of tabs 28 of the prior art links illustrated in FIGS. 1 and 2, which helps prevent a user's finger, hand, and/or clothing from being caught or pinched between adjacent, identically-configured links 300.

Figure 13:
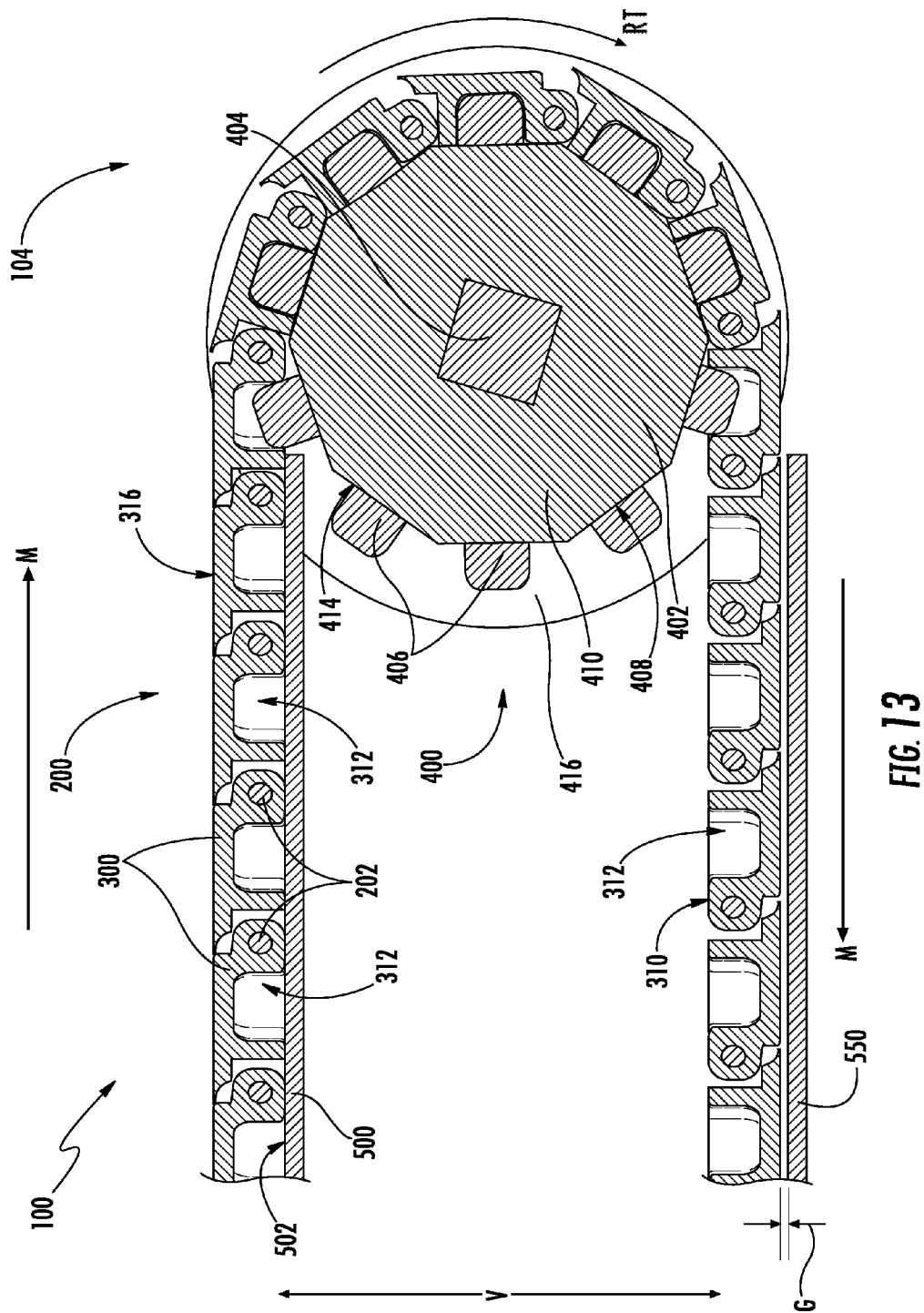
FIG. 13 provides a cross-section view of a portion of the conveyor system of FIG. 3, taken along the line 13-13.
Figure 14:
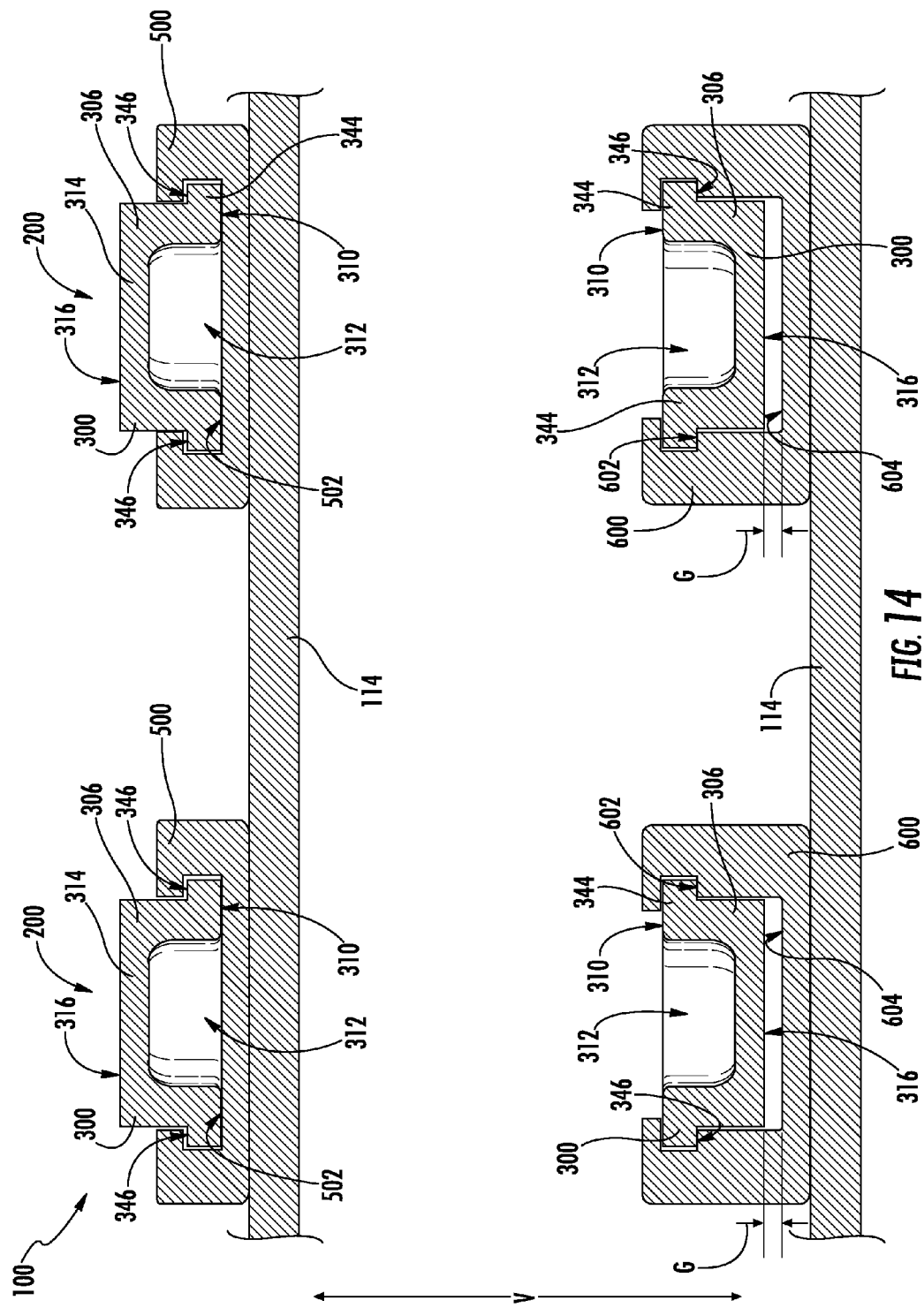
FIG. 14 provides a cross-section view of a portion of the conveyor system of FIG. 3, taken along the line 14-14.

FIG. 13 provides a lengthwise cross-section view of a portion of conveyor system 100, and FIG. 14 provides a widthwise cross-section view of a portion of conveyor system 100. As shown, a portion of chain 200 is received within an upper track 500 as chain 200 traverses a path 104 from return end 108 (FIG. 3) toward drive end 106 of conveyor system 100. More specifically, as shown in FIG. 14, bottom surface 310 of each link 300 of the portion of chain 200 received within upper track 500 slides along an upper sliding surface 502 toward sprocket assembly 400 positioned at drive end 106 (FIG. 3). That is, top surface 316 of each link 300 received within upper track 500 faces upward along the vertical direction V. Further, top surface 316 of each link 300 received within upper track 500 projects above upper track 500 along the vertical direction V such that items placed on chain 200, e.g., to be conveyed from one location to another by conveyor system 100, are not impeded by upper track 500. In some embodiments, such as the embodiment illustrated in FIG. 14, plate portion 314 of links 300 of the portion of chain 200 received within upper track 500 extends above the uppermost surface 504 of upper track 500. In other embodiments, only a portion of plate portion 314 may extend above uppermost surface 504.

As shown in FIG. 13, sprocket assembly 400 includes at least one sprocket 402 for engaging one chain 200 of conveyor assembly 100, i.e., at least one sprocket 402 is provided for each chain 200. Thus, for the exemplary conveyor system 100 illustrated in FIG. 3, at least two sprockets 402 are provided with sprocket assembly 400. Further, in the illustrated embodiment of FIG. 13, sprocket 402 has a plurality of teeth 406 and is non-rotatably mounted on a sprocket shaft 404 that extends in a direction that is normal to the plate of FIG. 13. Sprocket 402 engages with chain 200 when a tooth 406 of sprocket 402 is located within recess 312 of a link 300. Sprocket shaft 404 rotates in a direction of rotation RT, thereby driving chain 200 as teeth 406 of sprocket 402 engage recess 312 of successive links 300.

Referring now to FIG. 15, which provides an end-on view of an exemplary embodiment of sprocket 402, each sprocket tooth 406 may be spaced equidistantly about a perimeter surface 408 of sprocket 402, and each tooth 406 may be shaped to complement the shape of recess 312 (FIGS. 9-11). Further, as illustrated in FIGS. 13 and 15, the exemplary embodiment of sprocket 402 has ten teeth 406, and sprocket 402 has a body 410 extending between opposing sides 412 that are each generally shaped as a decagon such that body 410 defines a base surface 414 for each tooth 406. That is, each tooth 406 projects from a base surface 414 such that the number of base surfaces 414 of sprocket 402 equals the number of teeth 406. In other embodiments, sprocket 402 may have a different number of teeth 406 and body 410 may have a corresponding polygonal shape. In still other embodiments, body 410 may be generally cylindrical in shape, or body 410 may have any other appropriate shape.

Additionally, as illustrated in FIG. 15, a guide element 416 may be included adjacent each side 412 of sprocket 402. Referring back to FIG. 13, guide elements 416 may help align links 300 of chain 200 such that sprocket teeth 406 may engage recess 312 of links 300. Guide elements 416 may be substantially disc-shaped as shown in the illustrated embodiment, or guide elements 416 may have any other appropriate shape.

As links 300 of chain 200 traverse path 104 of chain 200 from drive end 106 toward return end 108 of conveyor system 100, as depicted in FIG. 3, a portion of chain 200 is received within a lower track 600, as shown in FIGS. 13 and 14. Upper surface 346 of siderails 344 of links 300 of the portion of chain 200 received within lower track 600 slides along a lower sliding surface 602 of lower track 600 as chain 200 traverses path 104 from drive end 106 toward return end 108. That is, top surface 316 of each link 300 received within lower track 600 faces downward along the vertical direction V and in opposition to an inner surface 604. In addition, lower sliding surface 602 is defined at a vertical distance above inner surface 604 of lower track 600 such that a gap G is defined between inner surface 604 and top surface 316 of links 300 within lower track 600. By spacing top surface 316 of links 300 forming chain 200 from inner surface 604, such that top surface 316 does not slide along inner surface 604, wear of top surface 316 of links 300 can be avoided or reduced.

Links 300 and chain 200 can be adapted to retrofit existing conveyor systems and track configurations by appropriate adjustments to $h_{link}$, $l_{link}$, $w_{link}$, $h_{plate}$, $h_{rail}$, $l_{rail}$, $w_{rail}$, $d_{recess}$, $D_1$, $D_2$, $D_3$, and G.

This written description uses examples to disclose the invention, including the presently determined best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A link for a mechanical chain that is configured for engaging sprocket teeth, the link defining a longitudinal direction, a transverse direction that is orthogonal to the longitudinal direction, and a vertical direction that is orthogonal to each of the longitudinal direction and the transverse direction, the link comprising:
a body extending in the longitudinal direction between a leading end and a trailing end, the body defining a pair of opposing sides, each side extending along the longitudinal direction, the body including:
a bottom surface extending transversely between the opposing sides and longitudinally between the leading end and the trailing end and defining a recess extending into the body in the vertical direction and configured for receipt of a sprocket tooth;
a male hinge element defined by the leading end;
a first female hinge element defined by the trailing end and disposed toward one opposing side of the body;
a second female hinge element defined by the trailing end and disposed toward the other opposing side of the body, the second female hinge element being spaced apart from the first female hinge element in the transverse direction so as to define a space between the two female hinge elements, the space being configured to complement the shape of the male hinge element,
wherein a longitudinal distance between the male hinge element and the first and second female hinge elements defines a link length $l_{link}$;
a plate portion having a solid upper surface that extends uninterruptedly in the transverse direction from one opposing side of the body to the other opposing side of the body and that extends uninterruptedly in the longitudinal direction from a leading edge to a trailing edge, the upper surface of the plate portion forming the top surface of the body and having a height $h_{plate}$ measured in the vertical direction such that the height $h_{plate}$ is less than a link height $h_{link}$, which is the distance measured in the vertical direction between the top surface and bottom surface of the body other than the portion of the body surface defining the recess,
wherein the plate portion defines a male portion disposed closer to the leading end than to the trailing end, the plate portion defining a female portion disposed closer to the trailing end than to the leading end, the female portion being configured to complement the male portion; and
wherein each side of the body defines a respective siderail extending in the longitudinal direction of the body, each siderail being defined by:
an upper surface disposed between the bottom surface of the body and the plate portion of the body, the upper surface including a pin-guiding surface;
a height $h_{rail}$ extending in the vertical direction from the bottom surface of the body to the upper surface of the siderail;
a length $l_{rail}$ extending in the longitudinal direction from the respective female hinge element toward the male hinge element; and
a width $w_{rail}$ extending in the transverse direction.

2. The link of claim 1, wherein the female portion of the plate portion defines a horn segment disposed toward each opposing side of the body.

3. The link of claim 2, wherein one end of a top edge of each horn segment becomes tangent to the trailing edge of the upper surface of the plate portion, and wherein an opposite end of the top edge of each horn segment becomes tangent to the respective opposing side of the body.

4. The link of claim 1, wherein the male hinge element, the first female hinge element, and the second female hinge element vertically are disposed between the plate portion and the bottom surface of the body.

5. The link of claim 1, wherein the male hinge element includes an aperture that extends therethrough in the transverse direction, the aperture having opposing ends, each end of the aperture having a tapered portion; and wherein the first female hinge element including an aperture that extends therethrough in the transverse direction; and wherein the second female hinge element including an aperture that extends therethrough in the transverse direction, such that when the male hinge element of an identically-configured link is received in the space the aperture of the male hinge element of the identically-configured link is coincident with both apertures of the two female hinge elements that define the space.

6. The link of claim 5, wherein the pin-guiding surface of each siderail is positioned adjacent an outer end of the aperture of the respective nearer female hinge element, each pin-guiding surface being shaped coincidentally with the aperture of the respective nearer female hinge element.

7. The link of claim 1, wherein the width $w_{rail}$ of each siderail is sufficient to ensure that the side-to-side distance measurement of the top surface of the plate portion is less than the side-to-side distance measurement of the bottom surface of the body.

8. The link of claim 1, wherein each siderail has an outer surface, the outer surface of one siderail being spaced apart from the outer surface of the other siderail along the transverse direction to define a link width $w_{link}$.

9. A mechanical chain, comprising:
a plurality of pins; and
a plurality of links configured for engaging sprocket teeth, the links defining a longitudinal direction, a transverse direction that is orthogonal to the longitudinal direction, and a vertical direction that is orthogonal to each of the longitudinal direction and the transverse direction, each link comprising:
a body extending in the longitudinal direction between a leading end and a trailing end, the body defining a pair of opposing sides, each side extending along the longitudinal direction, the body including:
a bottom surface extending transversely between the opposing sides and longitudinally between the leading end and the trailing end and defining a recess extending into the body in the vertical direction and configured for receipt of a sprocket tooth;
a male hinge element defined by the leading end, the male hinge element including an aperture that extends therethrough in the transverse direction, the aperture having opposing ends;
a first female hinge element defined by the trailing end and disposed toward one opposite side of the body, the first female hinge element including an aperture that extends therethrough in the transverse direction;
a second female hinge element defined by the trailing end and disposed toward the other opposite side of the body, the second female hinge element including an aperture that extends therethrough in the transverse direction, the second female hinge element being spaced apart from the first female hinge element in the transverse direction so as to define a space between the two female hinge elements, the space being configured to complement the shape of the male hinge element,
wherein a longitudinal distance between the male hinge element and the first and second female hinge elements defines a link length $l_{link}$;
a plate portion having a solid upper surface that extends uninterruptedly in the transverse direction from one opposing side of the body to the other opposing side of the body and that extends uninterruptedly in the longitudinal direction from a leading edge to a trailing edge, the upper surface of the plate portion forming the top surface of the body and having a height $h_{plate}$ measured in the vertical direction such that the height $h_{plate}$ is less than a link height $h_{link}$, which is the distance measured in the vertical direction between the top surface and bottom surface of the body other than the portion of the body surface defining the recess,
wherein the plate portion defines a male portion disposed closer to the leading end than to the trailing end, the plate portion defining a female portion disposed closer to the trailing end than to the leading end, the female portion being configured to complement the male portion; and
wherein each side of the body defines a respective siderail extending in the longitudinal direction of the body, each siderail being defined by:
an upper surface disposed between the bottom surface of the body and the plate portion of the body, the upper surface including a pin-guiding surface;
a height $h_{rail}$ extending in the vertical direction from the bottom surface of the body to the upper surface of the siderail;
a length $l_{rail}$ extending in the longitudinal direction from the respective female hinge element toward the male hinge element; and
a width $w_{rail}$ extending in the transverse direction;
wherein the male hinge element of one link is positioned within the space defined by the first female hinge element and second female hinge element of an adjacent, identically-configured link, and
wherein the aperture of the male hinge element of the one link and the apertures of the first and second hinge elements of the adjacent, identically-configured link are coincident and one of the plurality of pins is received in the apertures of the coincident apertures.

10. The mechanical chain of claim 9, wherein each link further comprises horn segments defined by the female portion of the plate portion, and wherein a horn segment is disposed toward each opposite side of the body.

11. The mechanical chain of claim 9, wherein the plate portion of one of the plurality of links vertically overlies the first female hinge element and the second female hinge element of an adjacent, identically-configured link.

12. The mechanical chain of claim 9, wherein the male hinge element, the first female hinge element, and the second female hinge element of each link are disposed between the plate portion and the bottom surface of the body.

13. The mechanical chain of claim 9, wherein the pin-guiding surface of each siderail of each link is positioned adjacent an outer end of the aperture of the respective nearer female hinge element, each pin-guiding surface being shaped coincidentally with the aperture of the respective nearer female hinge element.

14. The mechanical chain of claim 9, wherein each siderail has an outer surface, the outer surface of one siderail being spaced apart from the outer surface of the other siderail along the transverse direction to define a link width $w_{link}$.

15. A conveyor system, comprising:
at least one chain having a plurality of pins and a plurality of links configured for engaging sprocket teeth, the links defining a longitudinal direction, a transverse direction that is orthogonal to the longitudinal direction, and a vertical direction that is orthogonal to each of the longitudinal direction and the transverse direction, each link comprising:
a body extending in the longitudinal direction between a leading end and a trailing end, the body defining a pair of opposing sides, each side extending along the longitudinal direction, the body including:
a bottom surface extending transversely between the opposing sides and longitudinally between the leading end and the trailing end and defining a recess extending into the body in the vertical direction and configured for receipt of a sprocket tooth;
a male hinge element defined by the leading end, the male hinge element including an aperture that extends therethrough in the transverse direction, the aperture having opposing ends;
a first female hinge element defined by the trailing end and disposed toward one opposite side of the body, the first female hinge element including an aperture that extends therethrough in the transverse direction;
a second female hinge element defined by the trailing end and disposed toward the other opposite side of the body, the second female hinge element including an aperture that extends therethrough in the transverse direction, the second female hinge element being spaced apart from the first female hinge element in the transverse direction so as to define a space between the two female hinge elements, the space being configured to complement the shape of the male hinge element,
wherein a longitudinal distance between the male hinge element and the first and second female hinge elements defines a link length $l_{link}$;
a plate portion having a solid upper surface that extends uninterruptedly in the transverse direction from one opposing side of the body to the other opposing side of the body and that extends uninterruptedly in the longitudinal direction from a leading edge to a trailing edge, the upper surface of the plate portion forming the top surface of the body and having a height $h_{plate}$ measured in the vertical direction such that the height $h_{plate}$ is less than a link height $h_{link}$, which is the distance measured in the vertical direction between the top surface and bottom surface of the body other than the portion of the body surface defining the recess,
wherein the plate portion defines a male portion disposed closer to the leading end than to the trailing end, the plate portion defining a female portion disposed closer to the trailing end than to the leading end, the female portion being configured to complement the male portion; and
wherein each side of the body defines a respective siderail extending in the longitudinal direction of the body, each siderail being defined by:
an upper surface disposed between the bottom surface of the body and the plate portion of the body, the upper surface including a pin-guiding surface;
a height $h_{rail}$ extending in the vertical direction from the bottom surface of the body to the upper surface of the siderail;
a length $l_{rail}$ extending in the longitudinal direction from the respective female hinge element toward the male hinge element; and
a width $w_{rail}$ extending in the transverse direction;
wherein the male hinge element of one link is positioned within the space defined by the first female hinge element and second female hinge element of an adjacent, identically-configured link, and
wherein the aperture of the male hinge element of the one link and the apertures of the first and second hinge elements of the adjacent, identically-configured link are coincident and one of the plurality of pins is received in the apertures of the coincident apertures;
a support structure having a plurality of vertical supports, a plurality of horizontal supports, and at least one guide wall;
an upper track for receipt of a portion of the chain;
a lower track for receipt of another portion of the chain; and
a sprocket assembly including a sprocket shaft and a sprocket having plurality of sprocket teeth configured to engage the links of the chain.

16. The conveyor system of claim 15, wherein the upper track comprises an upper sliding surface, and wherein the bottom surface of each link of the portion of the chain received within the upper track slides along the upper sliding surface.

17. The conveyor system of claim 15, wherein the lower track comprises a lower sliding surface, and wherein the upper surface of the siderails of each link of the portion of the chain received within the lower track slides along the lower sliding surface.

18. The conveyor system of claim 15, wherein the lower track comprises an inner surface, and wherein a gap is defined between the inner surface and the top surface of each link of the portion of the chain received within the lower track.

19. The conveyor system of claim 15, wherein the sprocket comprises a body defining a base surface for each sprocket tooth.

20. The conveyor system of claim 15, wherein each sprocket tooth is configured to fit within the recess of each of the plurality of links to engage the links.

* * * * *